(12) United States Patent
Choe et al.

(10) Patent No.: US 8,294,797 B2
(45) Date of Patent: Oct. 23, 2012

(54) APPARATUS AND METHOD OF GENERATING A HIGH DYNAMIC RANGE IMAGE

(75) Inventors: Won-hee Choe, Gyeongju-si (KR); Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 12/469,524

(22) Filed: May 20, 2009

(65) Prior Publication Data

US 2010/0053385 A1   Mar. 4, 2010

(30) Foreign Application Priority Data

Aug. 27, 2008  (KR) .................. 10-2008-0084078

(51) Int. Cl.
- H04N 3/14 (2006.01)
- H04N 5/335 (2006.01)
- H04N 9/04 (2006.01)
- H04N 9/083 (2006.01)

(52) U.S. Cl. .................. 348/276; 348/279; 348/280

(58) Field of Classification Search .................. 348/266, 348/272, 273, 276, 277, 278, 279, 280
See application file for complete search history.

(56) References Cited

U.S. PATENT DOCUMENTS

| | | | | |
|---|---|---|---|---|
| 4,721,999 A | * | 1/1988 | Takemura et al. | 348/276 |
| 4,942,459 A | * | 7/1990 | Hieda et al. | 348/227.1 |
| RE34,926 E | * | 5/1995 | Hieda et al. | 348/223.1 |
| 5,506,618 A | * | 4/1996 | Yoneyama et al. | 348/234 |
| 5,592,223 A | * | 1/1997 | Takamura et al. | 348/309 |
| 5,786,588 A | * | 7/1998 | Takahashi | 250/208.1 |
| 6,137,100 A | * | 10/2000 | Fossum et al. | 250/208.1 |
| 6,529,239 B1 | * | 3/2003 | Dyck et al. | 348/279 |
| 6,704,046 B2 | * | 3/2004 | Dyas et al. | 348/223.1 |
| 6,924,841 B2 | * | 8/2005 | Jones | 348/294 |
| 7,095,441 B2 | * | 8/2006 | Nagano | 348/308 |
| 7,126,633 B2 | * | 10/2006 | Saito | 348/279 |
| 7,129,466 B2 | * | 10/2006 | Iwasaki | 250/214.1 |
| 7,148,920 B2 | * | 12/2006 | Aotsuka | 348/223.1 |
| 7,554,587 B2 | * | 6/2009 | Shizukuishi | 348/272 |
| 7,656,446 B2 | * | 2/2010 | Shizukuishi | 348/275 |
| 7,710,476 B2 | * | 5/2010 | Nomura et al. | 348/273 |
| 7,737,475 B2 | * | 6/2010 | Hynecek | 257/222 |
| 7,742,088 B2 | * | 6/2010 | Shizukuishi | 348/272 |

(Continued)

FOREIGN PATENT DOCUMENTS

JP   2002-135792   5/2002

(Continued)

*Primary Examiner* — Nicholas Giles (74) *Attorney, Agent, or Firm* — NSIP Law (57) ABSTRACT

An image generating apparatus including a filtering unit to filter a plurality of light signals including a first filter region and a second filter region. The first filter region may allow a complementary color wavelength band of an incident light signal to pass through and the second filter region may allow a whole wavelength band of the incident light signal to pass through. At least one of the first filter region and the second filter region includes two sub-regions configured to pass filtered light signals with two different sensitivities. In addition, an image sensing unit may sense at least one of the filtered light signals of different sensitivities in the complementary color wavelength band and the filtered light signals of different sensitivities in the whole wavelength band from the filtering unit and an image processing unit may generate an image based on the sensed light signals.

24 Claims, 7 Drawing Sheets

U.S. PATENT DOCUMENTS

| | | | |
|---|---|---|---|
| 7,852,389 B2 * | 12/2010 | Saito | 348/279 |
| 2002/0163583 A1 * | 11/2002 | Jones | 348/272 |
| 2003/0169354 A1 * | 9/2003 | Aotsuka | 348/272 |
| 2004/0017498 A1 * | 1/2004 | Yamashita et al. | 348/315 |
| 2004/0100570 A1 * | 5/2004 | Shizukuishi | 348/272 |
| 2004/0125222 A1 * | 7/2004 | Bradski et al. | 348/272 |
| 2004/0178478 A1 * | 9/2004 | Shizukuishi | 257/620 |
| 2004/0179120 A1 * | 9/2004 | Shizukuishi | 348/272 |
| 2007/0023801 A1 * | 2/2007 | Hynecek | 257/292 |
| 2007/0216785 A1 * | 9/2007 | Nomura et al. | 348/242 |
| 2007/0285540 A1 * | 12/2007 | Kwon et al. | 348/272 |
| 2009/0039340 A1 * | 2/2009 | Toda | 257/21 |
| 2009/0200584 A1 * | 8/2009 | Tweet et al. | 257/292 |
| 2010/0283866 A1 * | 11/2010 | Numata | 348/223.1 |

FOREIGN PATENT DOCUMENTS

| | | |
|---|---|---|
| JP | 2006-270356 | 10/2006 |
| JP | 2006-351972 | 12/2006 |
| JP | 10-2007-0120360 | 12/2007 |

* cited by examiner

APPARATUS AND METHOD OF GENERATING A HIGH DYNAMIC RANGE IMAGE

CROSS REFERENCE TO RELATED APPLICATION(S)

This application claims the benefit under 35 U.S.C. §119(a) of Korean Patent Application No. 10-2008-0084078, filed on Aug. 27, 2008, the disclosure of which is incorporated herein in its entirety by reference.

BACKGROUND

1. Field

The following description relates to an image generating apparatus and method. More particularly, this description relates to an image generating apparatus and method which can improve properties of sensitivity and dynamic range of an image.

2. Description of the Related Art

Use of devices that include a built-in camera, such as digital cameras and camera phones, is increasing A camera generally includes a lens and an image sensor. The lens collects light reflected from an object to be photographed. The image sensor detects and converts the collected light into an electric image signal. The image sensor generally includes a camera tube and a solid-image sensor. A charged coupled device (CCD) and a complementary metal oxide semiconductor (CMOS) are typical solid-image sensors.

To increase resolution of an image obtained by the camera, the unit area of each pixel in a sensing region is reduced while the total area of the sensing region is maintained. That is, as the unit area of each pixel is reduced, the number of pixels increases in proportion to the decreased unit area of each pixel, and consequently, a high-resolution image may be obtained. However, while such a method may produce a high-resolution image, it is difficult to achieve a highly sensitive image since the amount of light reaching each pixel decreases as much as the unit area decreases.

Furthermore, the pixels of current image sensors can have only one type of sensitivity at a time. Thus, a dynamic range sensor, having both high-sensitivity and low-sensitivity properties is required to photograph a scene containing objects of high luminance and low luminance.

Several wideband obtaining methods currently exist, such as a method of spatial sensitivity distribution of a sensor and a method of temporal sensitivity distribution of a sensor, in order to obtain a sensor with a plurality of sensitivities. However, the method of spatial sensitivity distribution causes deterioration in spatial resolution and integration and the method of temporal sensitivity distribution causes deterioration of image quality due to memory and prolonged time for photographing.

SUMMARY

In one general aspect, an image generating apparatus includes a filtering unit to filter a plurality of light signals including a first filter region and a second filter region, where the first filter region is configured to allow a complementary color wavelength band of an incident light signal to pass through and the second filter region is configured to allow a whole wavelength band of the incident light signal to pass through, at least one the first filter region and the second filter region include two sub-regions configured to pass the filtered light signals with two different sensitivities; an image sensing unit to sense at least one of the filtered light signals of different sensitivities in the complementary color wavelength band and the filtered light signals of different sensitivities in the whole wavelength band from the filtering unit; and an image processing unit to generate an image based on the sensed light signals.

The first filter region may include one of a cyan filter, a magenta filter, and a yellow filter.

The two sub-regions may have different light transmittances.

The image sensing unit may include a region corresponding to at least one of the first filter region and the second filter region, and the region of the image sensing unit may include at least two photoelectric conversion elements having light receiving regions of different sizes.

The image sensing unit may include a region corresponding to at least one of the first filter region and the second filter region and the region of the image sensing unit may include at least two photoelectric conversion elements with different photoelectric conversion efficiencies.

The at least two photoelectric conversion elements may vary a rate of change in resistance or capacitance according to an amount of light received.

The at least two photoelectric conversion elements may have different analog digital conversion gain values.

The image processing unit may generate at least one of new complementary color information by use of at least two light signals of different sensitivities passing through the complementary color wavelength band and new luminance information by use of at least two light signals of different sensitivities passing through the whole wavelength band, and may further generate the image based on at least one of the new complementary color information and the new luminance information.

The image processing unit may demosaick using at least one of the new complementary information and the new luminance information.

The image sensing unit may include a first sensing layer configured to sense light signals of the complementary color wavelength band and light signals of the whole wavelength band and a second sensing layer, disposed on a lower portion of the first sensing layer, to sense infrared light, wherein the image processing unit may generate an image using the sensed light signals of the complementary color wavelength band, the sensed light signals of the whole wavelength band, and the sensed infrared light signals.

In another general aspect, an image generating method implemented by image generating apparatus includes filtering light signals by a filtering unit including a first filter region configured to allow a complementary color wavelength band of an incident light signal to pass through and a second filter region configured to allow the whole wavelength band of the incident light signal to pass through, at least one the first filter region and the second filter region include at least two sub-regions configured to pass filtered light signals with two different sensitivities; sensing at least one of the two light signals of different sensitivities in the complementary color wavelength band and the two light signals of different sensitivities in the whole wavelength band from among the filtered light signals; and generating an image based on the sensed light signals.

The first filter region may include one of a cyan filter, a magenta filter, and a yellow filter.

The two sub-regions may have different light transmittances, respectively.

The sensing of the at least one light signal may include using at least two photoelectric conversion elements disposed on an area corresponding to at least one of the first filter region and the second filter region and the photoelectric conversion elements have light receiving regions of different sizes.

The sensing of the at least one light signal may include using at least two photoelectric conversion elements disposed on an area corresponding to at least one of the first filter region and the second filter region and the photoelectric conversion elements have different photoelectric conversion efficiencies.

The generating of the image may include at least one of generating new complementary color information using the at least two light signals of different sensitivities having the complementary color wavelength band and generating new luminance information using the at least two light signals of different sensitivities having the whole wavelength band, and generating an image based on at least one of the generated new complementary color information and the generated new luminance information.

The generating of the image may include demosaicking using at least one of the new complementary color information and the new luminance information.

The image generating method may further include sensing light signals of an infrared region, wherein generating the image comprises using the sensed light signals of the complementary color wavelength band, the sensed light signals of the whole wavelength band, and the sensed light signals of the infrared region.

Other features and aspects will be apparent from the following detailed description, the drawings, and the claims.

DETAILED DESCRIPTION

The following detailed description is provided to assist the reader in gaining a comprehensive understanding of the media, methods, apparatuses, and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
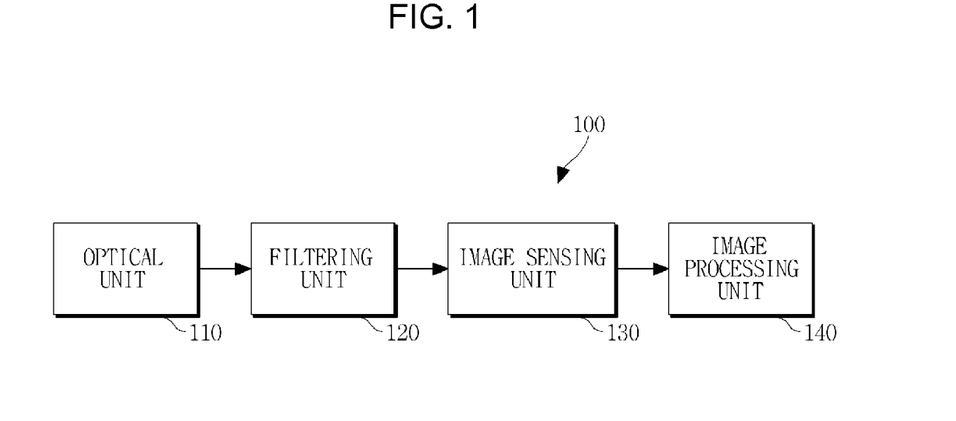
FIG. 1 is a block diagram illustrating an exemplary image generating apparatus.

FIG. 1 is a block diagram of an exemplary image generating apparatus 100. The image generating apparatus 100 includes an optical unit 110, a filtering unit 120, an image sensing unit 130, and an image processing unit 140. The image generating apparatus 100 may generate an image of a given object by use of a solid image sensor, such as a charge coupled device (CCD) and a complementary metal oxide semiconductor (CMOS). The image generating apparatus 100 may be implemented in, but is not limited thereto, a digital camera, a digital camcorder, a camera phone, and/or a personal digital assistant (PDA).

The optical unit 110 collects light reflected by an object. The optical unit 110 may include at least one lens. The number of lenses included in the optical unit 110 may vary according to desired purposes and requirements. A plurality of lenses may be disposed on a same plane in various arrangements.

The filtering unit 120 filters light signals incident through the optical unit 110 to provide light signals with a predetermined wavelength band. Individual filters included in the filtering unit 120 may be formed on a pixel basis. The filtering unit 120 may include a first filter region that allows only a complementary color wavelength band of the incident light signal to pass through and a second filter region that allows a whole wavelength band of the light signal to pass through.

The first filter region may be one of a cyan filter, which is a complementary color filter to a red color; a magenta filter, which is a complementary color filter for a green color; or a yellow filter, which is a complementary color filter for a blue color. When the first filter region includes the cyan filter, the first filter region allows only a green wavelength band and a blue wavelength band of the light collected by the optical unit 110 to pass through. When the first filter region includes the magenta filter, the first filter region allows only a red wavelength band and the blue wavelength band of the light collected by the optical unit 110 to pass through. When the first filter region includes the yellow filter, the first filter region allows only the red wavelength band and the green wavelength band to pass through. Hereinafter, it will be assumed, for exemplary purposes, that the first filter region includes the magenta filter.

In addition, the first filter region may include at least two sub-regions such that light signals may have at least two different sensitivities after passing through the first filter region. For example, at least two sub-regions of the first filter region may have different light transmittances.

The second filter region also may include at least two sub-regions such that light signals have two different sensitivities after passing through the second filter region. For example, at least two sub-regions of the second filter region may have different light transmittances. That is, the second filter region may include a white filter region and a grey filter region. A signal that has passed through the white filter region has a high sensitivity and one that has passed through the grey filter region has a low sensitivity. The white filter region may not have any filters formed therein.

Since the second filter region allows the whole wavelength band of a light signal to pass through, the amount of light reaching a pixel located at a position corresponding to the second filter region is greater than the amount of light reaching a pixel located at a position corresponding to the first filter region. Therefore, even when a sufficient amount of light increases within a limited area of the image sensing unit 130 and, consequently, a unit area of each pixel decreases, a reduction of the amount of light reaching each pixel may be prevented.

The image sensing unit 130 converts the light signal that has passed through the filtering unit 120 into an electric signal. The image sensing unit 130 obtains a red light signal $I_R$ and a blue light signal $I_B$ from the light signals that have passed through the first filter region and obtains white light signals $I_W$ from the light signals that have passed through the second filter region.

The image sensing unit 130 may sense at least two signals of different sensitivities, and the image processing unit 140 may generate a high dynamic range (HDR) image based on the sensed signals. For example, the image sensing unit 130 may sense one or both of at least two light signals of different sensitivities, which have passed through a complementary color wavelength band of the filtering unit 120, and at least two light signals of different sensitivities, which have passed through the whole wavelength band of the filtering unit 120.

The filtering unit 120 may be designed to generate at least two light signals of different sensitivities, in order to obtain at least two signals of different sensitivities by the image sensing unit 130. Moreover, the image sensing unit 130 also may sense light signals of the same sensitivity, which are filtered by the filtering unit 120, as having at least two different sensitivities.

Figure 2A:
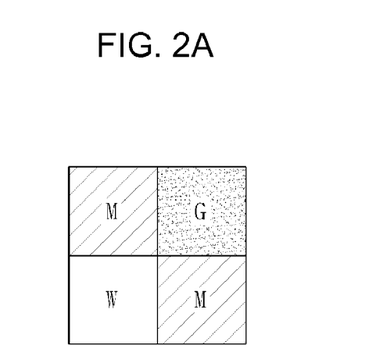
FIG. 2A is a diagram illustrating an exemplary filtering unit for obtaining signals of different sensitivities.
Figure 2B:
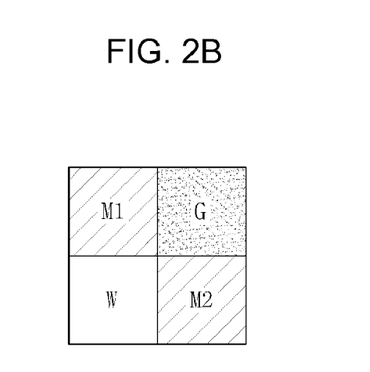
FIG. 2B is a diagram illustrating another exemplary filtering unit for obtaining signals of different sensitivities.

FIGS. 2A and 2B illustrate a filtering unit 120 to generate signals of different sensitivities. The filtering unit 120 may have four pixels as a unit structure, two of which are complementary color filters and the rest of which are whole wavelength band filters. The unit structure of the filtering unit 120 may extend horizontally or vertically.

Referring to FIG. 2A, the filtering unit 120 may include two magenta filters M and whole wavelength band filters W and G, which have different sensitivities. The whole wavelength band filters W and G may generate light signals of the whole wavelength band with different sensitivities. The second filter region may include the white filter W and the grey filter G, which create light signals that have different sensitivities once they have passed through the second filter region. The white filter W has a high light transmittance, and the grey filter G has a lower light transmittance than the white filter W. In this example, the image sensing unit 130 may sense a white signal $I_W$ that has passed through the white filter W and a grey signal $I_G$ that has passed through the grey filter G.

Referring to FIG. 2B, the filtering unit 120 may have a basic structure including two magenta filters M1 and M2 having different sensitivities and whole wavelength band filters W and G having different sensitivities. The basic structure of the exemplary filtering unit 120 as illustrated FIG. 2B is designed to provide at least two light signals of complementary color wavelength band of different sensitivities can be sensed as well as the signals of the whole wavelength band.

To allow the light signals that have passed through the first filter region to have different sensitivities, the first filter region may include the first magenta filter M1 and the second magenta filter M2, where the first magenta filter M1 has a light transmittance higher than that of the second magenta filter M2. In this case, the image sensing unit 130 may sense a first red light signal $I_{R1}$ and a first blue light signal $I_{B1}$, which are generated by the first magenta filter M1, and a second red light signal $I_{R2}$ and a second blue light signal $I_{B2}$, which are generated by the second magenta filter M2.

Although the filters of the filtering unit 120 shown in FIGS. 2A and 2B are arranged in a matrix, the filters may vary in their arrangements. For example, the first filter region may be located at a position corresponding to pixels on odd-numbered lines, and the second filter region may be located at a position corresponding to pixels on even-numbered lines. Additionally, each of the first and second filter regions may generate at least two or more signals of different sensitivities.

The image sensing unit 130 also may adjust a size of a light receiving region for each pixel to receive at least two light signals of different sensitivities. To this end, the image sensing unit 130 may include at least two photoelectric conversion elements which have differently sized light receiving regions corresponding to at least one of the first and second filter regions.

Figure 3:
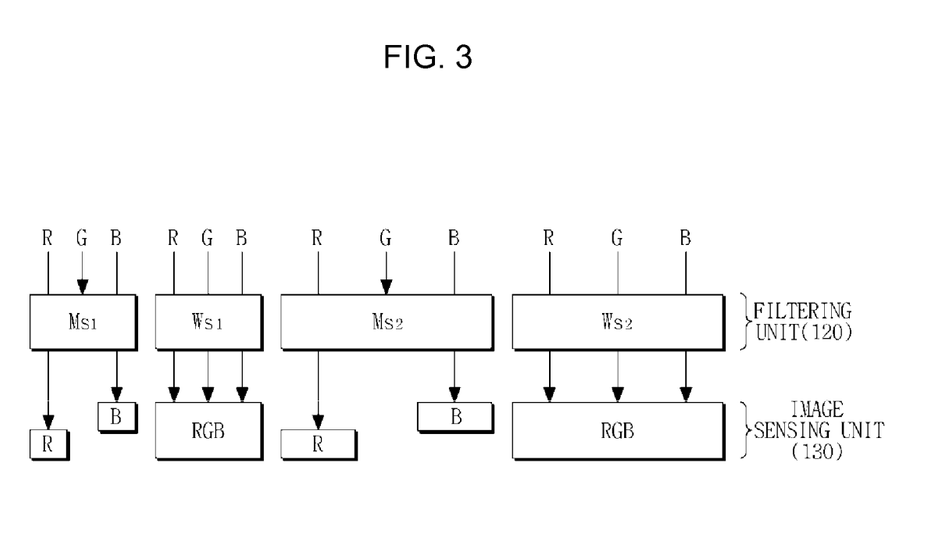
FIG. 3 is a diagram illustrating an exemplary filtering unit and an exemplary image sensing unit for obtaining signals of different sensitivities.

FIG. 3 illustrates an exemplary filtering unit 120 and an exemplary image sensing unit 130 to obtain signals of different sensitivities. The filtering unit 120 may include two magenta filters $M_{S1}$ and $M_{S2}$ having different pixel sizes corresponding to the size of the light receiving regions of the image sensing unit 130 and two whole-wavelength band filters $W_{S1}$ and $W_{S2}$ having different pixel sizes corresponding to the size of the light receiving regions of the image sensing unit 130. The two light receiving regions that sense the two magenta light signals may have different sizes. In addition, the other two light receiving regions that sense the two whole-wavelength band light signals also may have different sizes. As a result, the image sensing unit 130 may sense at least two light signals of complementary color wavelength band of different sensitivities and at least two other light signals of the whole wavelength band of different sensitivities.

Figure 4:
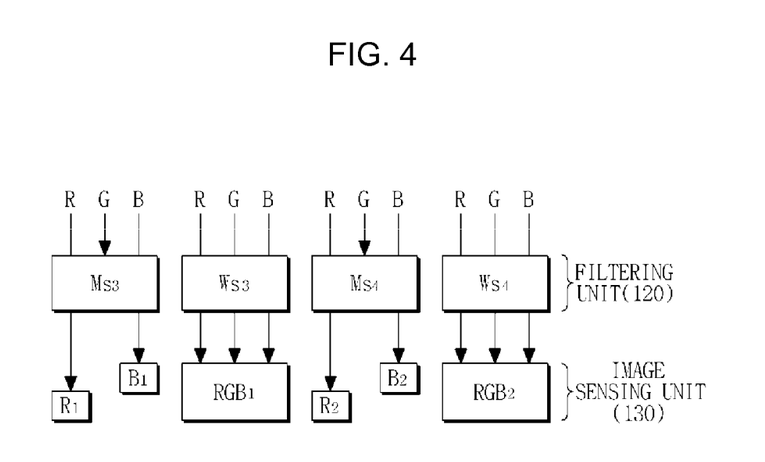
FIG. 4 is a diagram illustrating an exemplary filtering unit and an exemplary image sensing unit for obtaining light signals of different sensitivities.

FIG. 4 illustrates an exemplary filtering unit 120 and an exemplary image sensing unit 130 to obtain light signals of different sensitivities. The image sensing unit 130 may adjust a photoelectric conversion efficiency of each pixel to generate at least two light signals of different sensitivities in a plurality of pixels. Referring to FIG. 4, two magenta filters $M_{S3}$, $M_{S4}$ may have light receiving regions of the same size. Also, the image sensing unit 130 may have photoelectric conversion elements $R_1$, $B_1$ and $R_2$, $B_2$ corresponding to the magenta filters $M_{S3}$, $M_{S4}$, respective. The photoelectric conversion elements $R_1$, $B_1$, which correspond to the filter $M_{S3}$, and $R_2$, $B_2$, which correspond to the filter $M_{S4}$, may have different photoelectric conversion efficiencies from each other. To differentiate the photoelectric conversion efficiencies, the photoelectric conversion elements $R_1$, $B_1$ and the photoelectric conversion elements $R_2$, $B_2$ may be formed of different materials with a different temperature coefficient of resistance (TCR) to have different change rates of resistance or different change rates of capacitance, according to the amount of received light.

In a similar manner, the size of each light receiving region of the two whole-wavelength band filters $W_{S3}$, $W_{S4}$ may be the same. Photoelectric conversion elements $RGB_1$, $RGB_2$, which respectively correspond to filters $W_{S3}$, $W_{S4}$, may have different photoelectric conversion efficiencies.

Alternatively, the image sensing unit 130 may include at least two photoelectric conversion elements, which have different analog-digital conversion (ADC) gains for converting sensed analog signals into digital signals, and each of the photoelectric conversion elements may sense one of at least two light signals, which have different sensitivities and have passed through complementary color wavelength band, and one of at least two light signals, which have different sensitivities and have passed through the whole wavelength band.

Referring to FIG. 1, the image processing unit 140 may process a light signal converted into an electric signal to generate an image. The image processing unit 140 may "demosaic" each of a red light signal $I_R$ and a blue light signal $I_B$. Demosaicking is a process to restore color information that is not retained by a given pixel by use of color information of adjacent pixels around the given pixel.

The image processing unit 140 may achieve a YCrCb signal based on the red light signal $I_R$, the blue signal ($I_B$), and a white signal ($I_W$).

Generally, a relationship between a primary color, RGB, and a chrominance signal, YCbCr, may be expressed as follows:

$$Y = aR + bG + cB \qquad \text{Equation 1}$$

$$Cr = R - Y$$

$$Cb = B - Y$$

Here, luminance Y may be considered the same as the white light signal $I_W$. R may be considered identical with the demosaicked red light signal $I_R'$, and B may be considered identical with the demosaicked blue light signal $I_B'$.

Hence, the relationship between the primary colors and the chrominance signal may be represented as Equation 2.

$$I = I_W \qquad \text{Equation 2}$$

$$Cr = I_R' - Y$$

$$Cb = I_B' - Y$$

As shown in Equation 2, the color conversion may be simplified by using the complementary color filters and the white filters rather than converting the primary color signals into chrominance color signals by using all red, green, and blue light signals. Additionally, it is possible to convert the primary color signals into chrominance color signals without using a green filter. Moreover, the complementary color filters enable extraction of two color components from a pixel at the same position, and thus the extracted two color components may be represented with a twice-higher resolution than an image using a filter of a conventional Bayer pattern of RGB.

The image processing unit 140 may generate an HDR image using at least one of at least two whole wavelength band signals of different sensitivities and at least two complementary color wavelength band signals of different sensitivities. The image processing unit 140 may use at least two whole wavelength band signals to create new luminance information $I_{Wnew}$ to be applied to Equation 2 for generating an image. The image processing unit 140 also may use two different complementary color wavelength band signals to create new complementary color information $I_{Bnew}$, $I_{Rnew}$, and may perform a demosaick based on the created new complementary color information.

The image processing unit 140 may create both new luminance information and new complementary color information, and may generate an HRD image based on the new luminance and the complementary color information. A method of creating the new luminance information $I_{Wnew}$ and the new complementary color information $I_{Bnew}$ and $I_{Rnew}$ is described below.

When the image processing unit 140 creates both the new luminance information $I_{Wnew}$ and the new complementary color information $I_{Bnew}$, $I_{Rnew}$, Equation 2 may be modified as follows:

$$Y = I_{Wnew} \qquad \text{Equation 3}$$

$$Cr = I_{Rnew} - Y$$

$$Cb = I_{Bnew} - Y$$

Moreover, the image processing unit 140 may perform color mapping, white balance adjustment, and gamma adjustment on an image obtained by demosaicking the light signals, and may output and may display the processed image on a display apparatus (not shown).

Figure 5A:
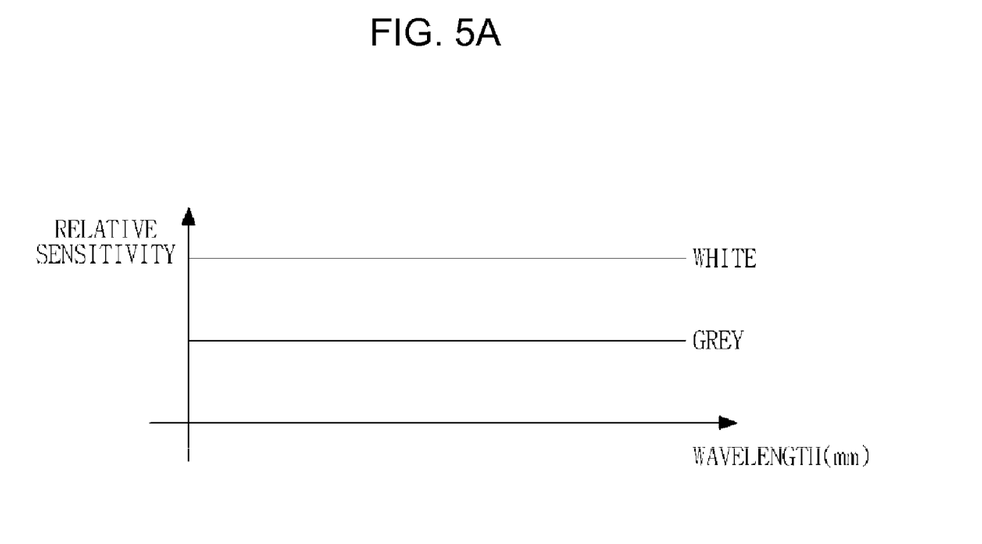
FIG. 5A is a graph illustrating exemplary spectrums of light signals obtained by an image sensing unit.
Figure 5B:
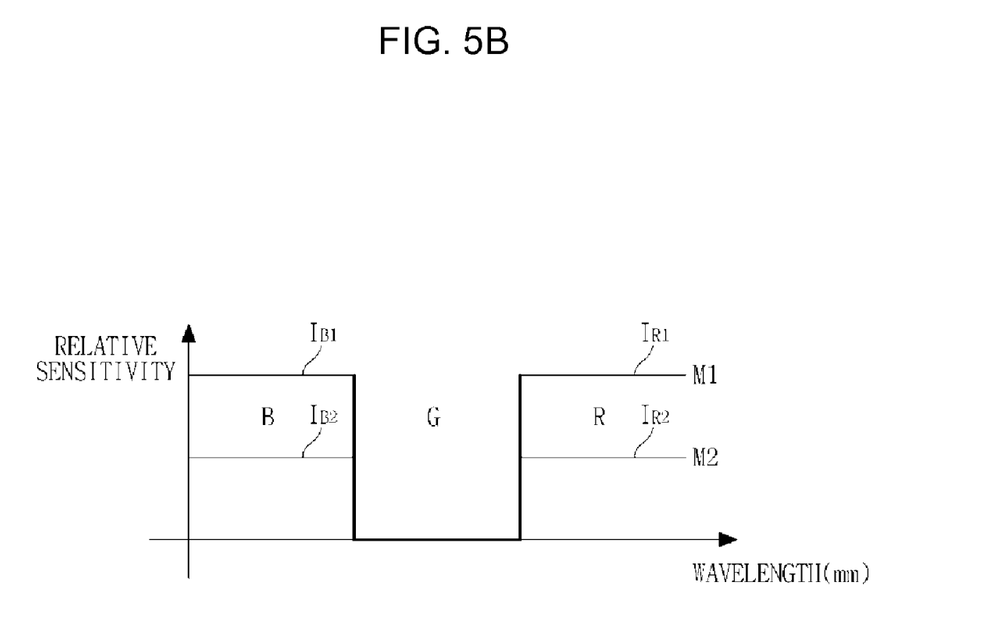
FIG. 5B is a graph illustrating additional exemplary spectrums of light signals obtained by an image sensing unit.

FIGS. 5A and 5B show exemplary spectrums of light signals obtained by the image sensing unit 130. FIG. 5A shows a spectrum of a light signal that may be sensed by a photoelectric conversion element at a position corresponding to a first filter region of an image sensing unit 130. As shown in FIG. 5A, a pixel at a position corresponding to the first filter region of the image sensing unit 130 may sense a light signal of the whole wavelength band. For example, FIG. 5A shows that a light signal that has passed through a white filter W has a higher sensitivity than a light signal that has passed through a grey filter G.

FIG. 5B illustrates a spectrum of a light signal which may be sensed by a photoelectric conversion element when a second filter region of an image sensing unit 130 is a magenta filter M. As shown in FIG. 5B, a pixel corresponding to the second filter region of the image sensing unit 130 senses a blue light signal and a red light signal, but not a green light signal. FIG. 5B also shows that a light signal that has passed through a magenta filter M1 has a higher sensitivity than that of a light signal that has passed through a magenta filter M2.

As described above, to obtain the light signals of different sensitivities as shown in FIGS. 5A and 5B, the filtering unit 120 may be configured in such a manner that the sensitivities may be adjusted as shown in FIGS. 2A and 2B, or pixels of the image sensing unit 130 may be configured to have different sizes of light receiving regions as shown in FIG. 3. Alternatively, as discussed with reference to FIG. 4, at least two photoelectric conversion elements with different photoelectric conversion efficiencies disposed on at least one of the first and second filter regions may be used.

Figure 6:
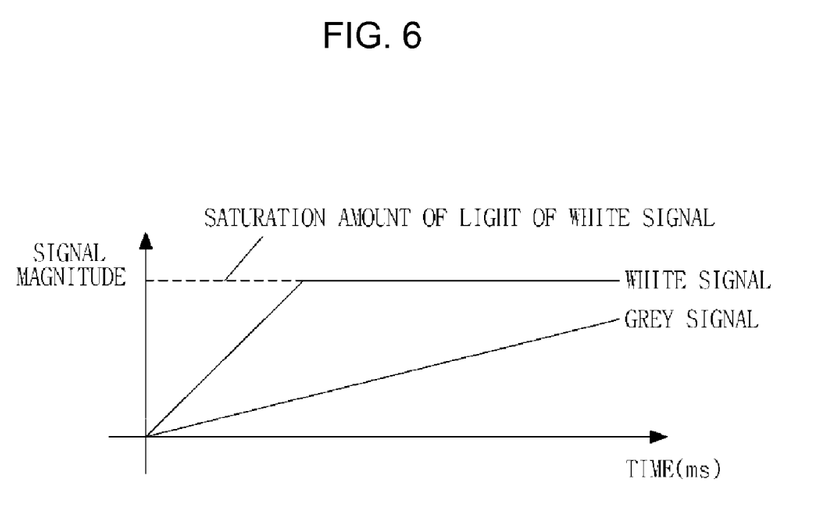
FIG. 6 is a graph illustrating exemplary sensitivities of light signals which have passed through a white filter and a grey filter, respectively.

FIG. 6 illustrates sensitivities of light signals which have passed through a white filter W and a grey filter G, respectively. A light signal (hereinafter, referred to as "a white signal") that has passed through the white filter W may become saturated more quickly, and may have a higher sensitivity, than a light signal (hereinafter, referred to as "a grey signal") that has passed through the grey filter G. FIG. 6 shows that the magnitude of the grey signal increases with the exposure time even after the white signal has been saturated after a certain period of time. For example, when the white signal is high-sensitive, it contains detailed information in low light, and when the grey signal is low-sensitive, it contains detailed information in bright light.

The image processing unit 140 may generate new luminance information using the white signal, the grey signal, and a ratio of the sensitivity of the white signal to the grey signal. The image processing unit 140 also may generate an image with a high dynamic range in terms of the luminance based on the new luminance information.

If the ratio of the sensitivity of the white signal to the grey signal is denoted by a, a may be represented as the gradient of a sensitivity graph of the light signal that has passed through the white filter W in relation to the gradient of a sensitivity graph of the light signal that has passed through the gray filter G. For example, when the gradient of the sensitivity graph of the white signal W is 1 and the gradient of the sensitivity graph of the grey signal G is ½, α is 2. Alternatively, α may be proportional to the ratio of the sensitivity of the white signal W to the grey signal G. Also, α may be predetermined to be a fixed value.

The new luminance information $I_{Wnew}$ may be represented by an equation including W, G, and α. For example, $I_{Wnew} = W + \alpha G$. However, an equation for calculating the new luminance information $I_{Wnew}$ may be modified in various ways as long as the equation uses the white signal W and the grey signal G.

The new luminance information contains the detailed information in low light of high sensitivity and the detailed information in bright light of low sensitivity. Therefore, by using the new luminance information $I_{Wnew}$, an image with a high dynamic range in terms of luminance may be generated.

FIG. 6 may be applied to a light signal that has passed through a complementary color filter with a different sensitivity. For example, as shown in FIG. 5B, the image progressing unit 140 may achieve a blue light signal $I_{B1}$ including detailed information in a low light of a high sensitivity, a blue light signal $I_{B2}$ including detailed information in a bright light of a low sensitivity, and a red light signal $I_{R1}$ including detailed information in a low light of a high sensitivity and a red light signal $I_{R2}$ including detailed information in a bright light of a low sensitivity.

Figure 7:
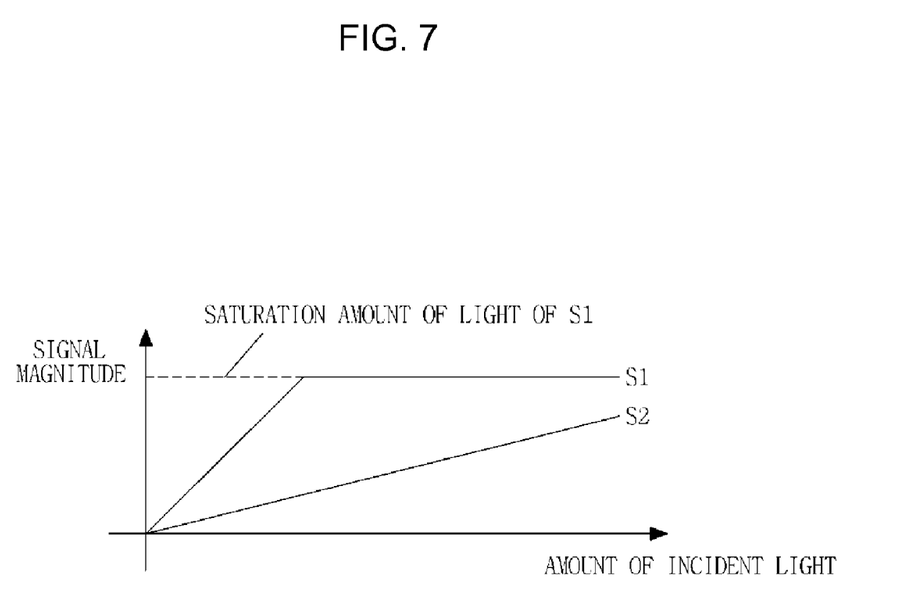
FIG. 7 is a graph illustrating exemplary sensitivities of light signals sensed by an image sensing unit including photoelectric conversion elements with different photoelectric conversion efficiencies.

The image processing unit 140 may generate a new blue information $I_{Bnew}$ using the blue light signals $I_{B1}$ and $I_{B2}$, and generate a new red color information $I_{Rnew}$ using the red light signals $I_{R1}$ and $I_{R2}$ in a same manner similar to calculating the new luminance information $I_{Wnew}$. Then, the image processing unit 140 may generate a YCbCr image based on new complementary color information, i.e., the new blue information $I_{Bnew}$ and the new red information $I_{Rnew}$. Alternatively, the image processing unit 140 may generate the YCbCr image based on the new luminance information $I_{Wnew}$, the new blue information $I_{Bnew}$, and the new red information $I_{Rnew}$. FIG. 7 illustrates by graph sensitivities of exemplary light signals sensed by an image sensing unit including photoelectric conversion elements with different photoelectric conversion efficiencies.

Referring to FIGS. 4 and 7, a signal S1 may be sensed in a sensing region $RGB_1$ corresponding to a filter $W_{S3}$ of the image sensing unit 130, and a signal S2 may be sensed in a sensing region $RGB_2$ corresponding to a filter $W_{S4}$ of the image sensing unit 130. The signal S1 is saturated with less incident light than the signal S2 and has a higher sensitivity. The signal S2 is not saturated with a great amount of incident light, which is more than sufficient for the signal S1 to be saturated. Thus, the signal S1 may include detailed information of an image in a low light of a high sensitivity, and the signal S2 may include detailed information of an image in a bright light of a low-sensitivity.

The graph in FIG. 7 may be applied to a case where the image sensing unit 130 includes two magenta filters $M_{S3}$ and $M_{S4}$ that have the same light receiving region and photoelectric conversion elements with different photoelectric conversion efficiencies. Sensing regions $R_1$ and $B_1$ may correspond to the magenta filter $M_{S3}$, and sensing regions $R_2$ and $B_2$ may correspond to the magenta filter $M_{S4}$ of the image sensing unit 130. Hence, the image processing unit 140 may generate new complementary color information using the signal S1, the signal S2, and a ratio of sensitivity of the signal S1 to the signal S2. Moreover, the image processing unit 140 may generate an image with a high dynamic range in terms of complementary colors based on the new complementary color information.

Figure 8:
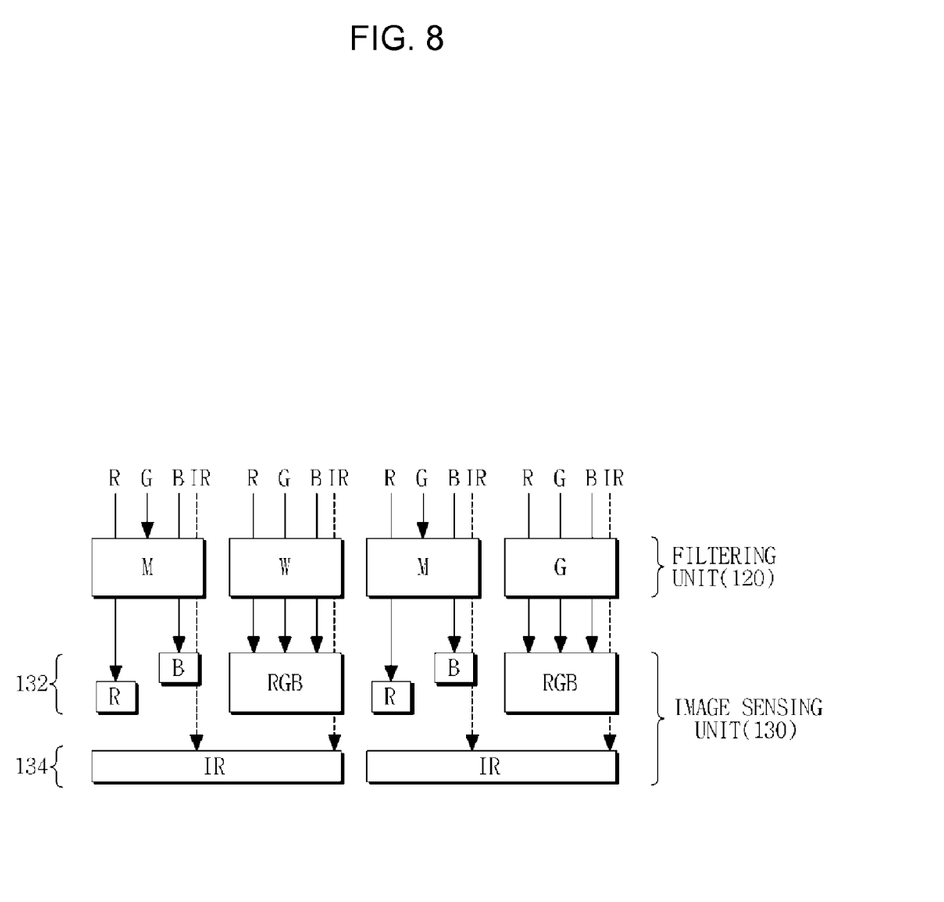
FIG. 8 is a configuration diagram illustrating an exemplary filtering unit and an exemplary image sensing unit for generating an image using visible rays and light signals of an infrared region.

FIG. 8 shows an exemplary filtering unit 120 and an exemplary image sensing unit 130 to generate an image using visible light and light signals of an infrared region. Referring to FIG. 8, the image sensing unit 130 may include a first sensing unit 132 that senses signals of complementary color wavelength band and whole wavelength band; and a second sensing layer 134 that is disposed at a lower portion of a sensing layer 132 and senses infrared light. In this example, the image processing unit 140 may generate an image using sensed light signals of the complementary color wavelength band and the whole wavelength band and light signals of the infrared range.

Figure 9:
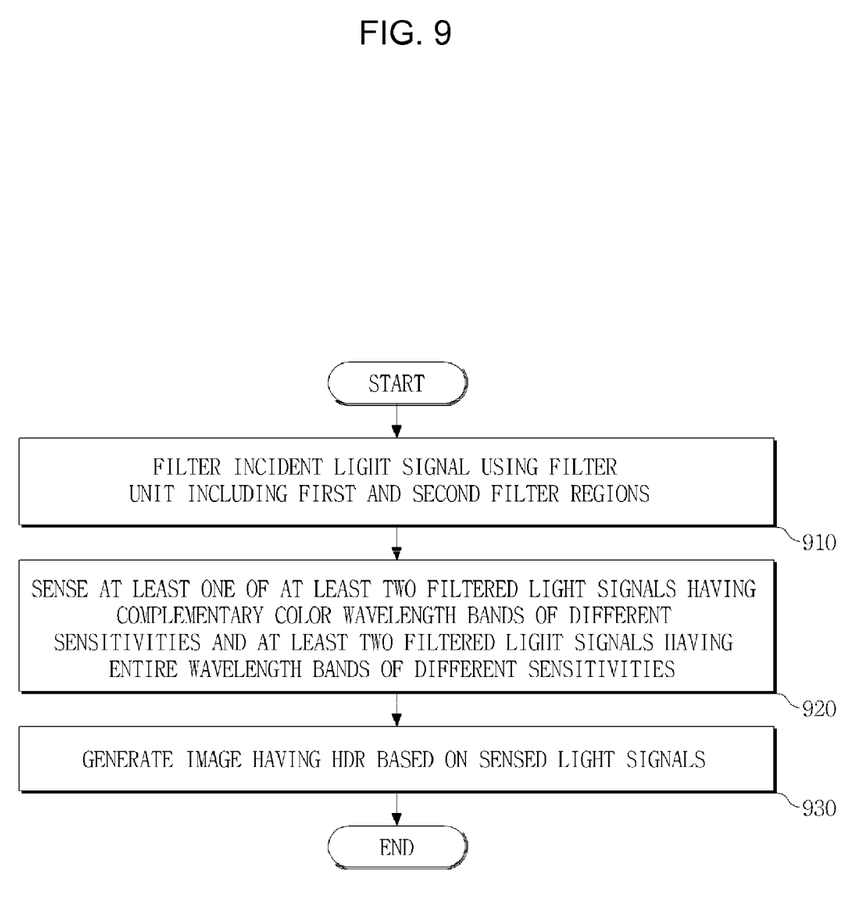
FIG. 9 is a flowchart illustrating an exemplary method of generating an image.

FIG. 9 provides a flowchart of an exemplary method of generating an image. An incident light signal is filtered by a filtering unit which may include a first filter region that allows a light signal of a complementary color wavelength band to pass through and a second filter region that allows a light signal of a whole wavelength band to pass through (910). The first filter region may be one of a cyan filter, a magenta filter, and a yellow filter. Each of the first filter region and the second filter region may include at least two sub-regions such that light signals that pass through either the first or second filter region may have at least two different sensitivities. For example, each of the first filter region and the second filter region may include at least two sub-regions with different light transmittances.

At least one of the at least two light signals that have passed through the complementary color wavelength band filter with different sensitivities and the at least two light signals that have passed through the whole wavelength band filter with different sensitivities is sensed from the filtered light signals (920). The light signal may be sensed by at least two photoelectric conversion elements with different light receiving regions. The photoelectric conversion elements may be disposed on positions corresponding to at least one of the first filter region and the second filter region.

An HDR image is generated based on the sensed light signals (930). When a significant amount of light signals of an infrared region is sensed, an image may be generated using the sensed light signals of the complementary color wavelength band, the sensed light signals of the whole wavelength band, and the sensed light signals of the infrared range.

Figure 10:
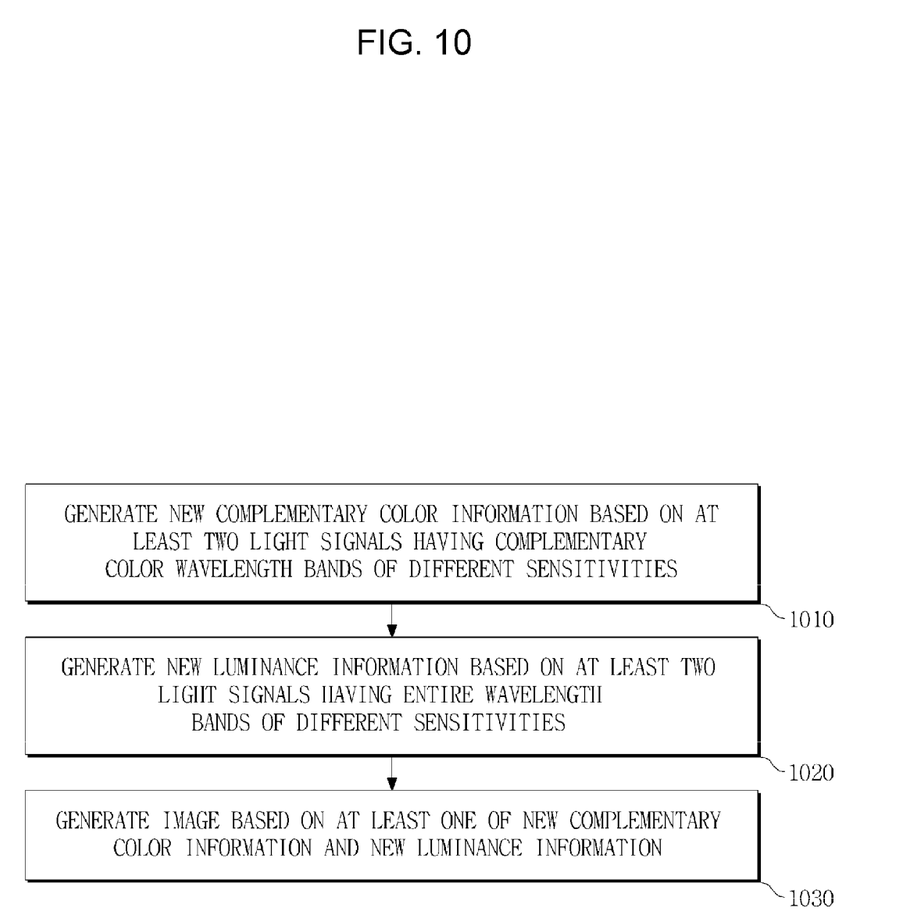
FIG. 10 is a flowchart illustrating further detail of the exemplary method of generating an image illustrated in FIG. 9.

FIG. 10 is a flowchart further illustrating the exemplary method of generating an image as shown in FIG. 9. New complementary color information is generated based on at least two light signals that have passed through complementary color wavelength band with different sensitivities (1010).

New luminance information is generated based on at least two light signals that have passed through the whole wavelength band with different sensitivities (1020). The new complementary color information generation 1010 and the new luminance information generation 1020 may be performed selectively or successively.

An HDR image is generated based on at least one of the generated new complementary color information and the generated new luminance information (1030). In the course of generating the image, demosaicking may be performed by use of at least one of the generated new complementary color information and the generated new luminance information.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image generating apparatus comprising:
a filtering unit comprising a first filter region comprising at least two sub regions configured to allow a complementary color wavelength band of an incident light signal with at least two different sensitivities to pass through, and a second filter region comprising at least two sub regions configured to allow a whole wavelength band of the incident light signal with at least two different sensitivities to pass through;

an image sensing unit to sense filtered light signals of different sensitivities in the complementary color wavelength band and the filtered light signals of the whole wavelength band from the filtering unit; and an image processing unit to generate an image based on the sensed light signals.

2. The image generating apparatus of claim 1, wherein the first filter region includes one of a cyan filter, a magenta filter, and a yellow filter configured to allow a complementary color wavelength band of one of cyan, magenta, and yellow with two different sensitivities to pass through.

3. The image generating apparatus of claim 1, wherein the two sub-regions have different light transmittances.

4. The image generating apparatus of claim 1, wherein the image sensing unit includes a region corresponding to at least one of the first filter region and the second filter region, and the region of the image sensing unit includes at least two photoelectric conversion elements having light receiving regions of different sizes.

5. The image generating apparatus of claim 1, wherein the image sensing unit includes a region corresponding to at least one of the first filter region and the second filter region and the region of the image sensing unit includes at least two photoelectric conversion elements with different photoelectric conversion efficiencies.

6. The image generating apparatus of claim 5, wherein the at least two photoelectric conversion elements are configured to vary a rate of change in resistance or capacitance according to an amount of light received.

7. The image generating apparatus of claim 5, wherein the at least two photoelectric conversion elements have different analog digital conversion gain values.

8. The image generating apparatus of claim 1, wherein the image processing unit is configured to generate at least one of new complementary color information by use of at least two light signals of different sensitivities passing through the complementary color wavelength band and luminance information by use of at least two light signals of different sensitivities passing through the whole wavelength band, and is further configured to generate the image based on at least one of the new complementary color information and the luminance information.

9. The image generating apparatus of claim 8, wherein the image processing unit is configured to demosaick using at least one of the new complementary color information and the luminance information.

10. The image generating apparatus of claim 1, wherein the image sensing unit includes a first sensing layer configured to sense light signals of the complementary color wavelength band and light signals of the whole wavelength band and a second sensing layer, disposed on a lower portion of the first sensing layer, to sense infrared light, wherein the image processing unit is configured to generate an image using the sensed light signals of the complementary color wavelength band, the sensed light signals of the whole wavelength band, and the sensed infrared light signals.

11. An image generating method implemented by image generating apparatus, the method comprising:

filtering light signals by a filtering unit comprising a first filter region comprising at least two sub regions configured to allow a complementary color wavelength band of an incident light signal with at least two different sensitivities to pass through, and a second filter region comprising at least two sub regions configured to allow a whole wavelength band of the incident light signal with at least two different sensitivities to pass through;

sensing the light signals of different sensitivities in the complementary color wavelength band and the light signals of the whole wavelength band from among the filtered light signals; and generating an image based on the sensed light signals.

12. The image generating method of claim 11, wherein the first filter region includes one of a cyan filter, a magenta filter, and a yellow filter configured to allow a complementary color wavelength band of one of cyan, magenta, and yellow with two different sensitivities to pass through.

13. The image generating method of claim 11, wherein the two sub-regions have different light transmittances.

14. The image generating method of claim 11, wherein the sensing of at least one light signal comprises using at least two photoelectric conversion elements disposed on an area corresponding to at least one of the first filter region and the second filter region and the photoelectric conversion elements have light receiving regions of different sizes.

15. The image generating method of claim 11, wherein the sensing of at least one light signal comprises using at least two photoelectric conversion elements disposed on an area corresponding to at least one of the first filter region and the second filter region and the photoelectric conversion elements have different photoelectric conversion efficiencies.

16. The image generating method of claim 11, wherein generating the image comprises at least one of generating new complementary color information using at least two light signals of different sensitivities having the complementary color wavelength band and generating luminance information using at least two light signals of different sensitivities having the whole wavelength bands, and generating an image based on at least one of the generated new complementary color information and the generated luminance information.

17. The image generating method of claim 16, wherein the generating the image comprises demosaicking using at least one of the new complementary color information and the luminance information.

18. The image generating method of claim 11, further comprising:

sensing light signals of an infrared region, wherein generating the image comprises using the sensed light signals of the complementary color wavelength band, the sensed light signals of the whole wavelength band, and the sensed light signals of the infrared region.

19. An image generating apparatus comprising:

a filtering unit comprising a first filter region comprising two sub regions configured to allow a complementary color wavelength band of an incident light signal with two different sensitivities to pass through, and a second filter region configured to allow a whole wavelength band of the incident light signal to pass through;

an image sensing unit to sense filtered light signals of different sensitivities in the complementary color wavelength band and the filtered light signals of the whole wavelength band from the filtering unit; and an image processing unit to generate an image based on the sensed light signals, wherein the filtering unit comprises a repeating 2×2 pixel pattern, and the 2×2 pixel pattern comprises a top row comprising a first complimentary colored pixel and a grey pixel, and a bottom row comprising a white pixel and a second complimentary colored pixel of the same color as the first complimentary colored pixel.

20. The image generating apparatus of claim 19, wherein the first complimentary colored pixel and the second complimentary colored pixel allow complimentary light to pass at different respective sensitivities, and the grey pixel and the white pixel allow whole-wavelength light to pass at different respective sensitivities.

21. An image generating apparatus comprising:
a filtering unit comprising a first filter region and a second filter region to filter a plurality of light signals, wherein the first filter region is configured to allow a complementary color wavelength band of an incident light signal with at least two different sensitivities to pass through and the second filter region is configured to allow a whole wavelength band of the incident light signal with at least two different sensitivities to pass through,
an image sensing unit comprising a region corresponding to the first filter region and the second filter region, the region comprising at least two photoelectric conversion elements having light receiving regions of different sizes configured to sense at least one of the filtered light signals of different sensitivities in the complementary color wavelength band and the filtered light signals of different sensitivities in the whole wavelength band from the filtering unit; and
an image processing unit to generate an image based on the sensed light signals.

22. An image generating apparatus comprising:
a filtering unit comprising a first filter region and a second filter region to filter a plurality of light signals, wherein the first filter region is configured to allow a complementary color wavelength band of an incident light signal with at least two different sensitivities to pass through and the second filter region is configured to allow a whole wavelength band of the incident light signal with at least two different sensitivities to pass through,
an image sensing unit comprising a region corresponding to the first filter region and the second filter region, the region comprising at least two photoelectric conversion elements with different photoelectric conversion efficiencies configured to sense at least one of the filtered light signals of different sensitivities in the complementary color wavelength band and the filtered light signals of different sensitivities in the whole wavelength band from the filtering unit; and
an image processing unit to generate an image based on the sensed light signals.

23. The image generating apparatus of claim 22, wherein the at least two photoelectric conversion elements are configured to vary a rate of change in resistance or capacitance according to an amount of light received.

24. The image generating apparatus of claim 22, wherein the at least two photoelectric conversion elements comprise different analog digital conversion gain values.

* * * * *